May 6, 1924.
W. J. PHELPS
SOLDER SPOOL
Filed Dec. 30, 1920
1,493,381
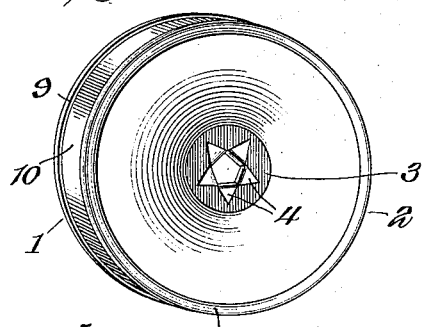
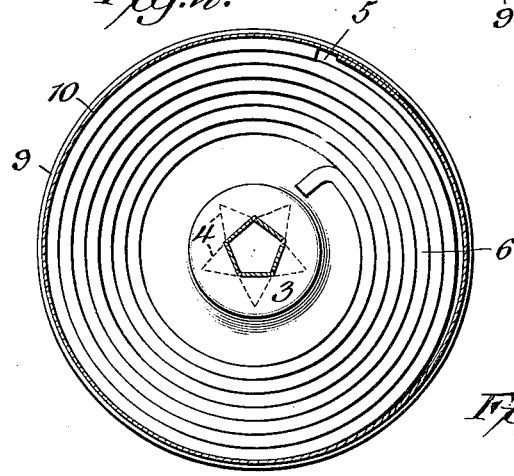
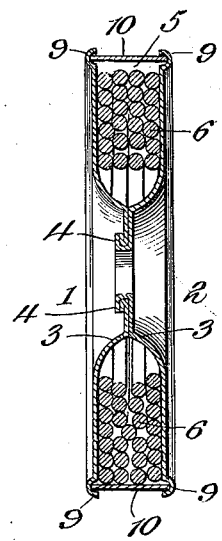
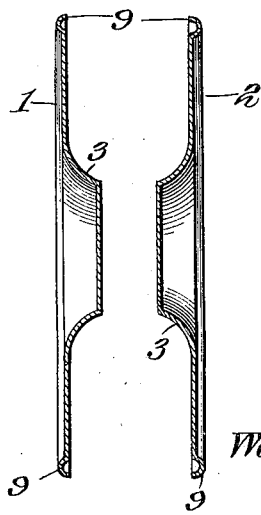
Walter J. Phelps,
INVENTOR,
WITNESSES
BY
ATTORNEY Patented May 6, 1924.

1,493,381

UNITED STATES PATENT OFFICE.

WALTER J. PHELPS, OF BALTIMORE, MARYLAND.

SOLDER SPOOL.

Application filed December 30, 1920. Serial No. 433,997.

*To all whom it may concern:*

Be it known that I, WALTER J. PHELPS, a citizen of the United States, residing at Baltimore city, State of Maryland, have invented new and useful Improvements in Solder Spools, of which the following is a specification.

This invention has reference to solder spools or holders, and is designed particularly for holding small quantities of string solder in a convenient form for handling and transportation and the solder may be used for various purposes.

The solder spool, which may be made from tin plate, comprises two heads or disks, which may be of identical shape, each formed with a central dished portion or hub having a flat face designed to meet and engage the hub of the other head and the two hubs are then united centrally by punching through the meeting faces and upsetting the punched through portions to form integral rivets whereby the two heads become firmly united with the union so strong as to withstand all ordinary use, while the structure as a whole is so cheap that when the solder has been used up, the spool or support may be thrown away.

It is intended to utilize scrap tin from tin can manufacturing plants for the production of the spools and place the solder upon the market wound upon the spools for delivery to workmen and for convenient carrying of the solder, wound on the spools, in the pockets of the workmen.

String solder is quite flexible, but is not materially elastic, so that it may be bent as may be desired to present the solder to the place to be soldered, which place, by way of example, may be considered as the minute filling perforations in the heads of cans containing gasoline, although the invention may be otherwise used than for the particular purpose named.

In other applications filed by me, for the method of and means for filling liquids into cans, filed December 24, 1920, Serial No. 432,974, and for can filling machines filed December 30, 1920, Serial No. 433,996, I have shown and described the filling of cans with gasoline or other liquids, which cans may be of small capacity and designed particularly for the utilization of casing-head gasoline, where a valuable product, either wastefully used or entirely wasted, may be cheaply saved, and the present invention is particularly useful in the operation of sealing such cans filled or approximately filled with gasoline.

The supply of casing-head gasoline is considerably scattered and, consequently, means heretofore proposed for saving the gasoline have proven too expensive for practical use. It is in order to so reduce the cost of saving the gasoline as to make the procedure worth while, that this invention was evolved so that the sealing of the cans may be performed without expensive apparatus, and consequently small quantities, representing but a few ounces of the gasoline for each container, may be packed and rendered proof against wastage at an expense sufficiently low, under the conditions encountered, that the packages are salable at a sufficiently low price to permit the use of the gasoline for priming explosion engines, especially automobile engines.

The invention will be best understood from a consideration of the following detailed description, taken in connection with the accompanying drawings forming a part of this specification, with the understanding, however, that the invention is not confined to any strict conformity with the showing of the drawings, but may be changed and modified so long as such changes and modifications mark no material departure from the salient features of the invention as expressed in the appended claims.

In the drawing:—

Figure 1 is a perspective view of a completed spool, containing a small quantity of string solder.

Figure 2 is a section through the spool in a plane perpendicular to the axis of the spool and on a larger scale than Figure 1.

Figure 3 is a diametric section of the spool on the same scale as Figure 2.

Figure 4 is a diametric section on the same scale as Figures 2 and 3 but showing the two heads of the spool separated and prior to being joined.

Referring to the drawings, there are shown two identical disks 1 and 2, which may be conveniently made of tin plate, such as is customarily employed in the production of small tin cans and of a size permitting the utilization of tin scrap produced in the manufacture of the tin cans.

The two disks 1 and 2, being in substantially all respects identical, a description of one will answer for the other. Each disk is in most part flat and is provided with a dished portion 3 at its central part, thereby constituting a corresponding portion of a hub produced when the two disks are brought together face to face. By means of a suitable tool, the material of the hub portions of the disks is simultaneously punched out from one side of the completed spool, so that both punched out portions project toward the other side of the completed spool in the form of tongues 4, which are thereupon upset against that face of the dished parts of the heads or disks remote from the entering end of the punch. This operation does not remove any of the material, so that the tongues are folded one upon the other and back against the hub portion of the completed spool, riveting the two heads of the spool together. In order to prevent any turning of the heads upon each other, the tongues 4 are made triangular or other similar shape, but any particular form is not obligatory.

Because the hub portions are dished, the body portions of the two heads are spaced apart, with the major portions of the disks parallel with each other, thus providing a groove or cavity 5 in the spool. This cavity is to receive a quantity 6 of string solder, such form of solder being usually employed in sealing the filling openings of tin cans having such openings of very small size.

In preparing the string solder for application to the spool, the solder is wound upon a suitable mandrel of appropriate size, so far as the coil is concerned. The coil of solder is then removed from the mandrel and applied to the spool before the latter is assembled, after which the second head of the spool is brought into engagement with the first head with the preformed coil of solder between the two heads, after which the heads are joined, as already described, by punching tongues from the material of the heads to form joining rivets.

The marginal portion of each head is provided with an outstanding bead 9 forming a stiffening bead and, in the assembled spool, these beads face each other and also constitute a seat for the marginal turns of the solder coil, as well as the seat for a strip 10 of paper or the like hiding the solder before it is put into use.

Such a solder spool, which in commercial form may be two or more inches in diameter and about ½ inch thick, will hold from 36 to 38 linear inches of string solder and will also conveniently go into the vest pocket or other similar receptacle in the clothing of the workman, providing sufficient solder for sealing numerous cans.

The solder spool with its load of solder makes a convenient vehicle for the solder, especially in localities where casing-head gasoline is available and where it is desirable to minimize the installation costs to a very small sum.

The solder spool may, for some purposes, be of small size holding in the neighborhood of a yard of solder or it may be of materially larger size. By winding the solder on winding machines, and then completing the spool by applying two substantially identical heads to opposite sides of the solder coil and then riveting the two heads of the spool together, the manufacture of the completed solder spool is greatly facilitated.

What is claimed is:—

1. A spool for holding string solder, comprising two substantially identical flat disks, each with a centrally located inwardly extending dished portion having a flat zone, with the two zones brought face-to-face and secured together, the flat portions of the disks beyond the dished portions being spaced apart and forming a relatively wide channel for the reception of the solder, the marginal portion of each disk being provided with an outstanding annular bead, the beads on said disks facing each other and forming a seat, and a strip of material removably seated at its edges in the beads and arranged wholly within and between the disks to constitute a temporary cover for a coil of string solder located between said disks, said strip being removed when the spool is put in use.

2. A spool for holding string solder, comprising two substantially identical flat disks, each with a centrally disposed dished portion engaging the other dished portion and formed with integral spurs traversing both dished portions and upset thereagainst.

3. A spool for holding string solder, comprising two substantially identical flat disks, each with a centrally disposed dished portion with a flat zone and the two zones brought face to face and having the material of both interlocked against one face of the spool.

In testimony that I claim the foregoing as my own, I have hereto affixed my signature.

WALTER J. PHELPS.